United States Patent
Arbuckle et al.

(10) Patent No.: US 6,637,952 B2
(45) Date of Patent: Oct. 28, 2003

(54) NOTCHED CAMERA CASE WITH SWIVEL BASE

(75) Inventors: James F. Arbuckle, Fresno, CA (US); William S. Arbuckle, Fresno, CA (US); Gregory S. Giroux, Fresno, CA (US)

(73) Assignee: Pelco, Clovis, CA (US)

( * ) Notice: Subject to any disclaimer, the term of this patent is extended or adjusted under 35 U.S.C. 154(b) by 0 days.

(21) Appl. No.: 09/999,713

(22) Filed: Oct. 30, 2001

(65) Prior Publication Data

US 2002/0051640 A1 May 2, 2002

Related U.S. Application Data

(60) Provisional application No. 60/245,402, filed on Nov. 1, 2000.

(51) Int. Cl.⁷ .................. G03B 17/00; G03B 17/02; H04N 9/47
(52) U.S. Cl. .................. 396/427; 396/535; 348/143
(58) Field of Search .................. 396/27, 427, 535; D16/203, 204; 348/81, 82, 143, 373

(56) References Cited

U.S. PATENT DOCUMENTS

| | | | | |
|---|---|---|---|---|
| 3,338,146 A | * | 8/1967 | Schmidt .................. 396/189 |
| 3,367,616 A | | 2/1968 | Bausch et al. .............. 248/483 |
| D221,403 S | | 8/1971 | Matsumoto et al. ........ D16/204 |
| 3,643,566 A | | 2/1972 | Ando et al. .................. 396/27 |
| 4,008,372 A | | 2/1977 | Ueno et al. .................. 348/357 |
| 4,394,692 A | | 7/1983 | Randmae et al. ............ 348/374 |
| 4,420,240 A | | 12/1983 | Katsuma et al. ............ 396/535 |
| 4,632,348 A | | 12/1986 | Keesling et al. ......... 248/222.11 |
| 4,819,016 A | * | 4/1989 | Leonard et al. .............. 396/535 |
| D307,915 S | | 5/1990 | Kuester, III ............... D16/203 |
| 4,936,533 A | | 6/1990 | Adams et al. .......... 248/222.11 |
| 4,945,367 A | * | 7/1990 | Blackshear .................. 396/427 |
| 5,068,720 A | | 11/1991 | Herlitz et al. .................. 348/82 |
| 5,149,146 A | | 9/1992 | Simoni .................... 285/146.1 |
| 5,153,623 A | | 10/1992 | Bouvier ...................... 396/427 |
| D332,473 S | | 1/1993 | Chan ......................... D21/514 |
| D334,761 S | | 4/1993 | Ina et al. .................... D16/202 |
| 5,224,675 A | | 7/1993 | Ellenberger et al. ...... 248/183.4 |
| 5,227,822 A | | 7/1993 | Takahashi et al. .......... 396/424 |
| D340,940 S | | 11/1993 | Ellenberger et al. ....... D16/242 |
| D349,714 S | | 8/1994 | Hasegawa .................. D16/203 |
| D349,911 S | | 8/1994 | Shimizu et al. ............ D16/203 |
| D350,553 S | * | 9/1994 | Lo ............................. D16/203 |
| 5,649,256 A | | 7/1997 | Wen .......................... 396/427 |
| 5,739,479 A | * | 4/1998 | Davis-Cannon et al. . 178/18.04 |
| 5,790,910 A | | 8/1998 | Haskin ...................... 396/427 |
| D403,340 S | | 12/1998 | Arbuckle ................... D16/203 |
| 5,845,885 A | | 12/1998 | Carnevali ................ 248/181.1 |
| 5,921,694 A | | 7/1999 | Herbermann ................ 403/56 |
| 6,017,010 A | | 1/2000 | Cui ....................... 248/288.31 |
| 6,019,524 A | | 2/2000 | Arbuckle .................... 396/427 |
| D439,588 S | * | 3/2001 | Bergstrom et al. ......... D16/203 |
| D446,801 S | * | 8/2001 | Adachi et al. ............. D16/203 |
| 6,375,369 B1 | * | 4/2002 | Schneider et al. .......... 396/427 |
| D460,773 S | * | 7/2002 | Arbuckle et al. .......... D16/203 |

OTHER PUBLICATIONS

PELCO CCC4000 Series CCD Color Camera Installation/Operation Manual C1925M, Mar. 1999, p. 4.*

* cited by examiner

Primary Examiner—Christopher Mahoney
(74) Attorney, Agent, or Firm—Mark D. Miller

(57) ABSTRACT

The present invention provides a compact case for a surveillance camera having exterior notches, recesses and/or grooves for accommodating the electronic receptors, connectors, wires and/or cables leading from the back of the camera. The case is designed for use with a specialized mounting system and covers, or to fit inside a secure enclosure having the same overall (and minimal) profile as the camera case itself which eliminate exposure of the electronic components in the notches to the outside. An adjustable protective base is provided in one embodiment.

17 Claims, 11 Drawing Sheets

NOTCHED CAMERA CASE WITH SWIVEL BASE

This application claims the benefit of provisional application serial No. 60/245,402 filed on Nov. 1, 2000.

BACKGROUND OF THE INVENTION

1. Field of the Invention

The present invention relates to surveillance camera systems, and more particularly to a case for holding the electronics and optics of a surveillance camera that has one or more notched out relief areas for accommodating the physical connectors and wire leads to the camera, such that the and camera case fits snugly inside a camera enclosure having interior dimensions that are essentially the same as the exterior dimensions of the camera case, and a protective swivel base for supporting such an enclosure.

2. Description of the Prior Art

The use of surveillance camera systems has become increasingly widespread. The surveillance cameras for such systems must frequently be deployed in places where there is very little available space for the camera or its enclosure. In addition, such cameras must often be mounted outdoors where they may be subjected to dramatic temperature, moisture and other climactic changes, as well as potential vandalism. Accordingly, there is a great need for smaller and more compact surveillance cameras and camera enclosures, as well as a need for a smaller and more secure camera enclosure.

Most existing surveillance cameras have physical wire connections for power input and video output, as well as other physical wire connections for controlling different functions (lens control, motor, etc.) of the camera. These wires are usually attached to connectors of some kind that attach to corresponding receptors or jacks on the back of the camera. The connectors and wires generally extend out and away from the back of the camera.

Typically, surveillance cameras are placed inside protective enclosures to prevent damage to the camera from moisture, temperature, climate changes and/or vandalism. The wires and coaxial cables extending away from the camera are usually bent inside the enclosure and routed through an opening, but such wires cannot be bent or twisted too severely or they may fail. As a result, a significant amount of space is required inside the typical surveillance camera enclosure for the connectors and wires which attach to and extend from the rear of the camera itself. The designs of many existing enclosures call for the wires leading from the camera enclosure to be exposed to the outside where they can be damaged or severed.

A wide variety of camera cases having different shapes and styles have been developed over the years having such features as external handles, support brackets and eye pieces. However, no camera case has been developed for the purpose of minimizing the overall exterior profile of the camera in order to conserve space to allow the camera and case to fit inside a similarly minimally-sized enclosure.

It is therefore desirable to provide a minimally sized case and enclosure for a surveillance camera that allows the camera to be deployed in a small space, while keeping the wires and connectors leading from the camera inside the enclosure to prevent damage, deterioration or vandalism. It is also desirable to provide an adjustable mount or base for such a camera enclosure that keeps the wires leading from the enclosure inside, while also providing adjustability of the camera position.

SUMMARY OF THE INVENTION

The present invention provides a notched camera case that can fit inside a secure enclosure having the same overall (and minimal) profile as the camera case itself which accommodates the receptors, connectors, wires and cables leading from the back of the camera using one or more notches in the camera case. In addition, according to the design of the present invention, a mounting system and covers are provided for the notched camera case which eliminates exposure of the receptors, connectors, wires and cables leading to or from the camera case to the outside.

The camera case of the present invention includes one or more notched recesses or relief notches on its exterior. These notches may be provided at the back, along the sides, and/or in the corners of the camera case. The receptor jacks for such connections as the video-out, power supply, lens control, etc. are provided in the notched recesses. One or more receptors may be provided in a single notch, or a plurality of notches may be provided for the various receptors. Each notch is of sufficient size to receive the connector(s) corresponding to the receptor(s) in the notch. Each notch also includes additional space for the wire(s) leading from the connector(s) to extend and bend away from the camera case. Elongated exterior recesses or grooves may also be provided in the camera case of the present invention as channels for receiving and guiding the wires leading from the camera case to a focal point.

The notched design of the camera case of the present invention provides space in the exterior of the case itself for all receptors, connectors, wires and cables that are attached to the case. Accordingly, in one aspect of the invention, an enclosure may be fitted around the notched camera case having the same overall dimensional profile as the exterior of the notched camera case without the need for extra room at the rear of the enclosure for receptors, connectors, wires and cables leading to or from the camera case. More particularly, the interior dimensions of an enclosure for the notched camera case may be the same as the exterior dimensions of the camera case itself without the notches.

In another aspect of the invention, a specialized mount is provided which takes advantage of the notches in the camera case by providing a protective covering for the notches as well as the connectors, wires and cables attached to the camera case so that none of them are exposed to the outside.

In another aspect of the invention, an adjustable base is provided which maintains the camera wires on the inside and provides a positioning and viewing range of one hundred eighty degrees (180°) in one plane and three hundred sixty degrees (360°) within the plane parallel to the wall or ceiling to which the base is mounted using a dual-ball socket coupler for connecting the base to the camera mount.

It is therefore a primary object of the present invention to provide a small and compact case for a surveillance camera that includes one or more recessed exterior notches into which external electronic receptors, jacks and/or switches are deployed, the notches being of sufficient size to accommodate the connectors and wires which correspond to the receptors and jacks without affecting the overall dimensional profile of the case.

It is also a primary object of the present invention to provide a compact case for a surveillance camera having one or more exterior recesses or grooves for accommodating the external receptors, jacks, switches, connectors and/or wires associated with operation of the camera without changing the exterior dimensional profile of the case itself.

It is also a primary object of the present invention to provide specialized covers for protecting the electrical components located in the exterior recesses of the notched camera case of the present invention.

It is also an important object of the present invention to provide a compact camera case having exterior notches therein for accommodating external electrical components associated with the camera, and an enclosure having the same dimensional profile as the case for snugly surrounding the case to protect the electrical components in the notches.

It is also a primary object of the present invention to provide a small and efficient mounting apparatus for a notched camera case and its associated mounts, covers and/or enclosure having coordinated attachments that accommodate and protect the notches, exterior electrical components and wires leading from the camera case, while providing support for the case itself.

It is also an important object of the present invention to provide an adjustable base for the notched camera case and mount of the present invention which protects the camera wires by routing them through the inside, and which provides a positioning and viewing range of one 180° in one plane and 360° within the plane parallel to the wall or ceiling to which the base is mounted.

Additional objects of the invention will be apparent from the detailed descriptions and the claims herein.

DETAILED DESCRIPTION OF THE PREFERRED EMBODIMENTS

Figure 1:
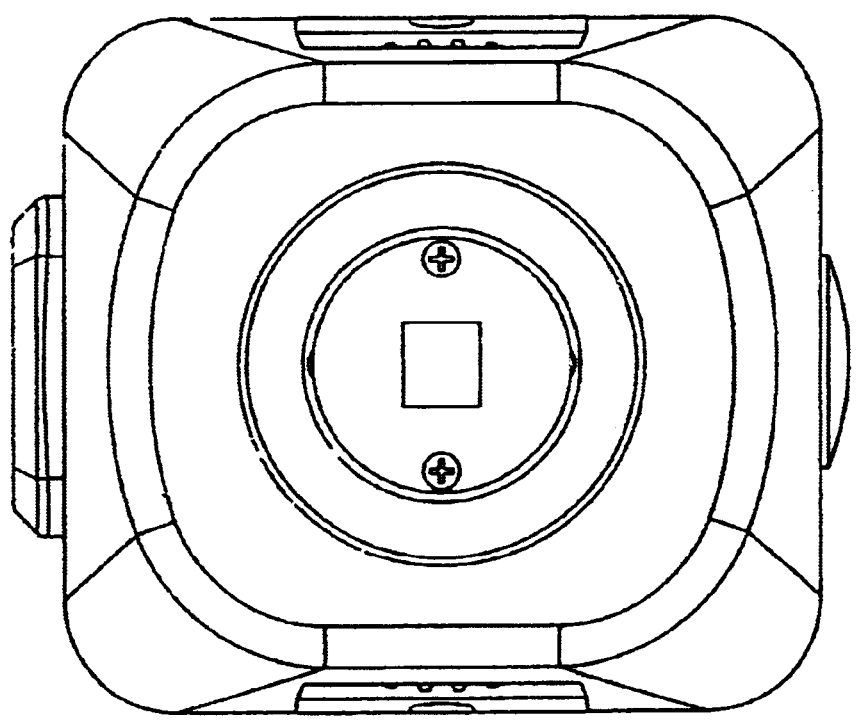
FIG. 1 is a front elevational view of the notched camera case of the present invention.
Figure 2:
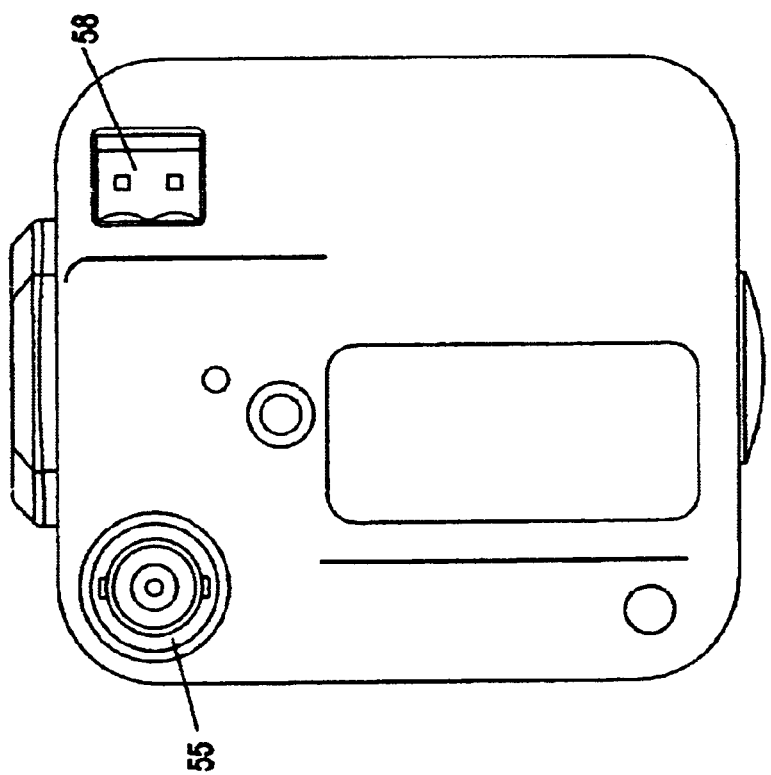
FIG. 2 is a rear elevational view thereof.
Figure 3:
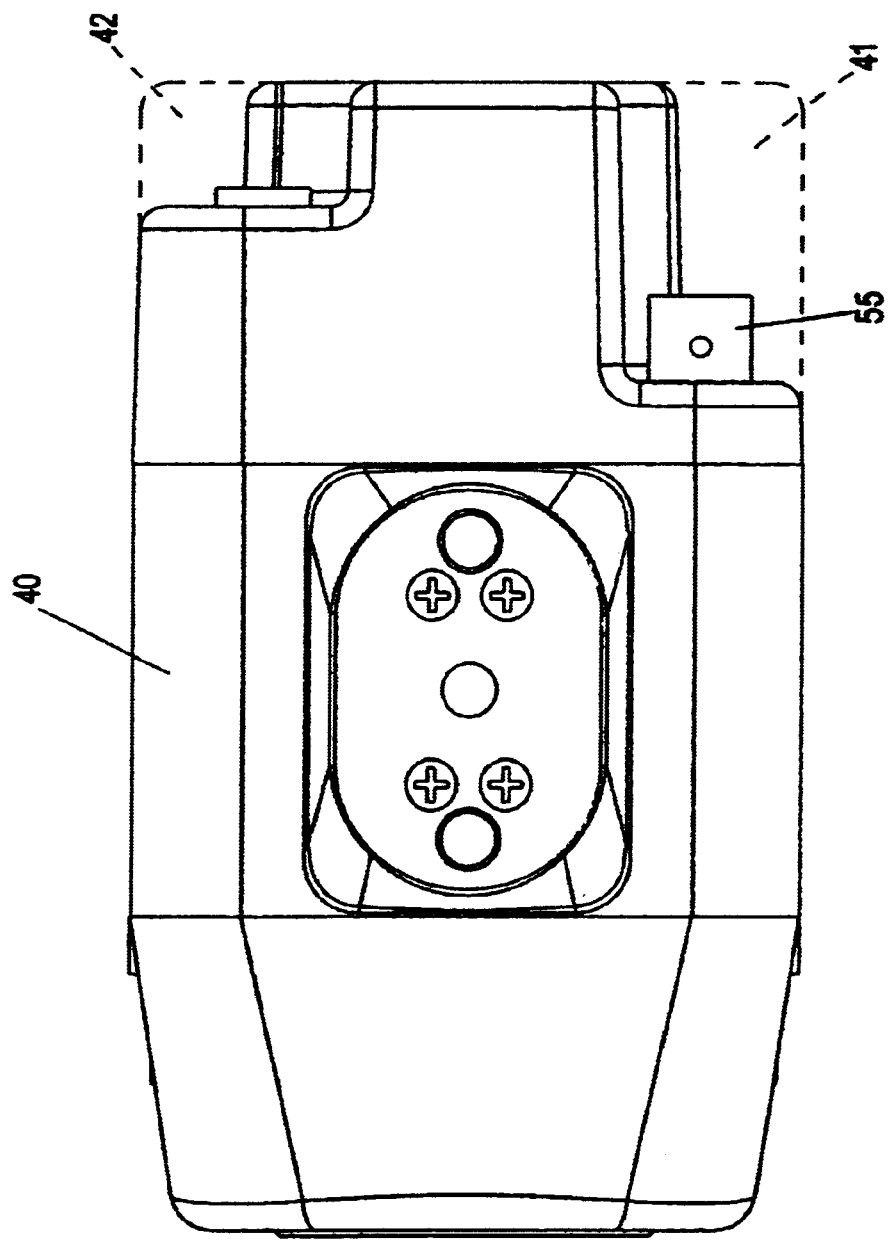
FIG. 3 is a top plan view thereof.
Figure 4:
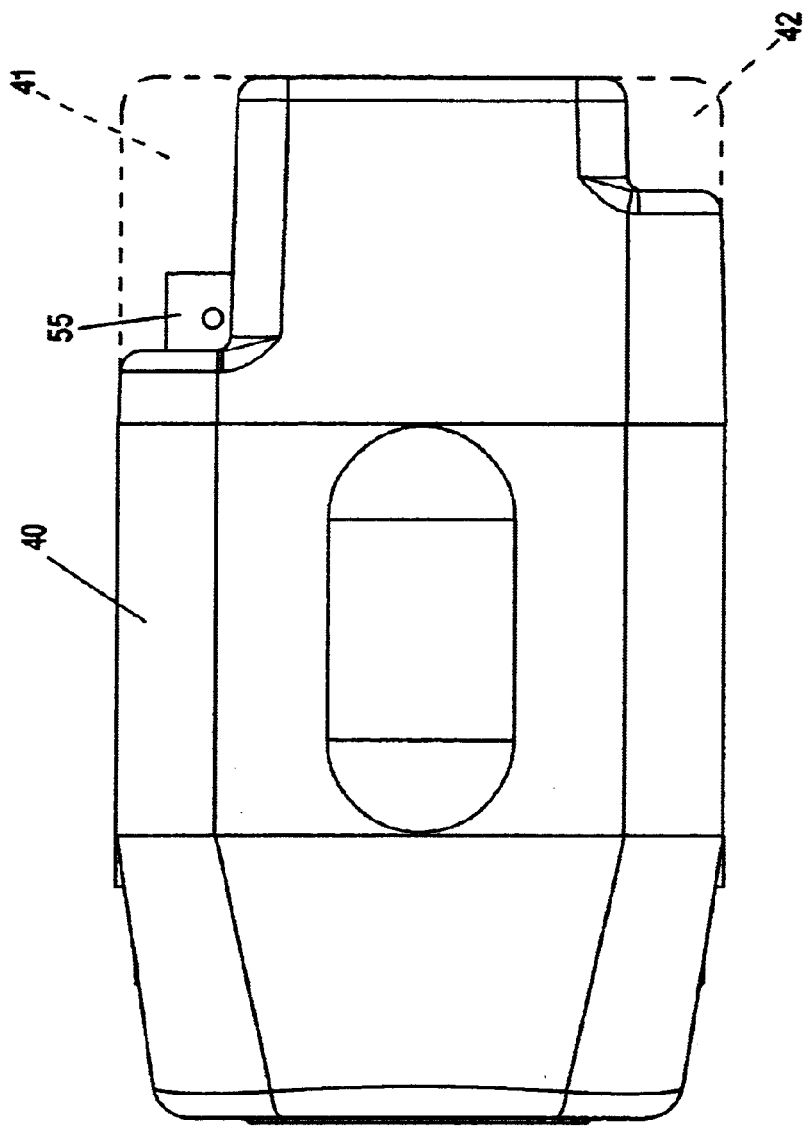
FIG. 4 is a bottom plan view thereof.
Figure 5:
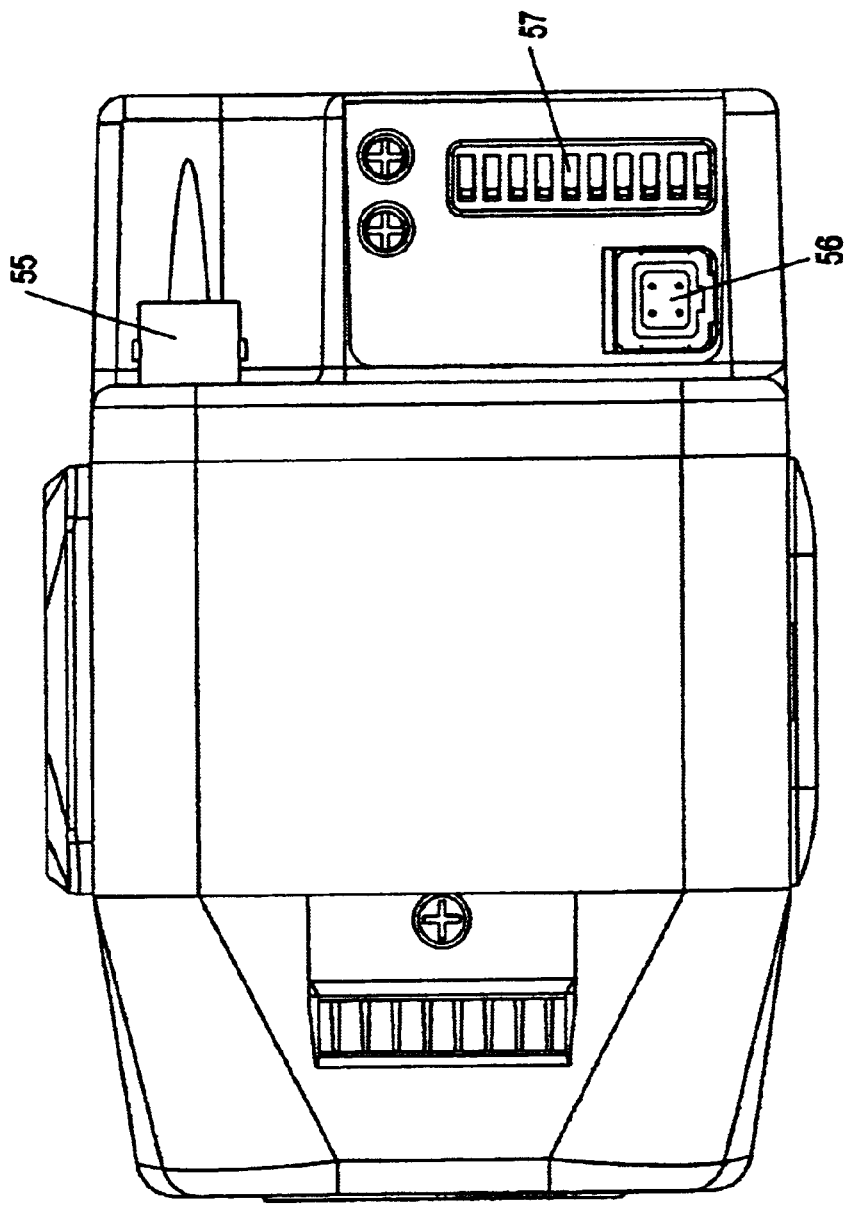
FIG. 5 is a left side elevational view thereof.
Figure 6:
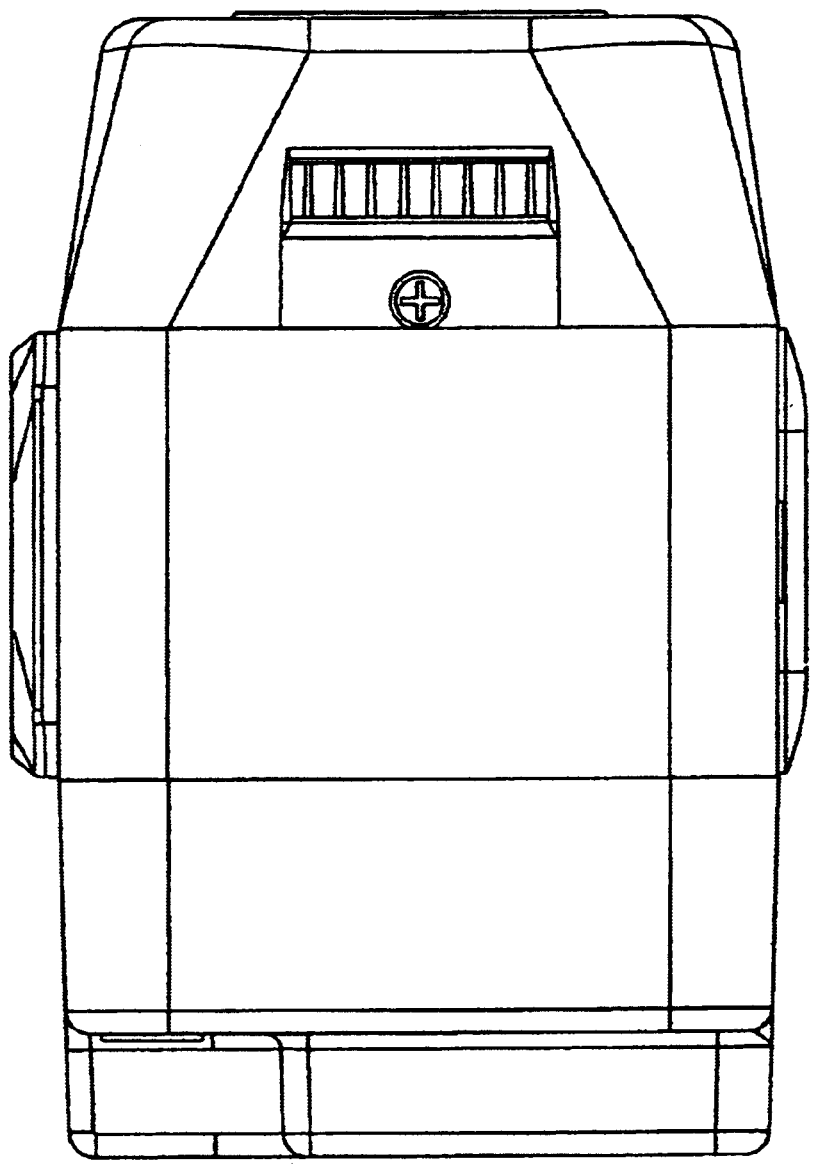
FIG. 6 is a right side elevational view thereof.
Figure 7:
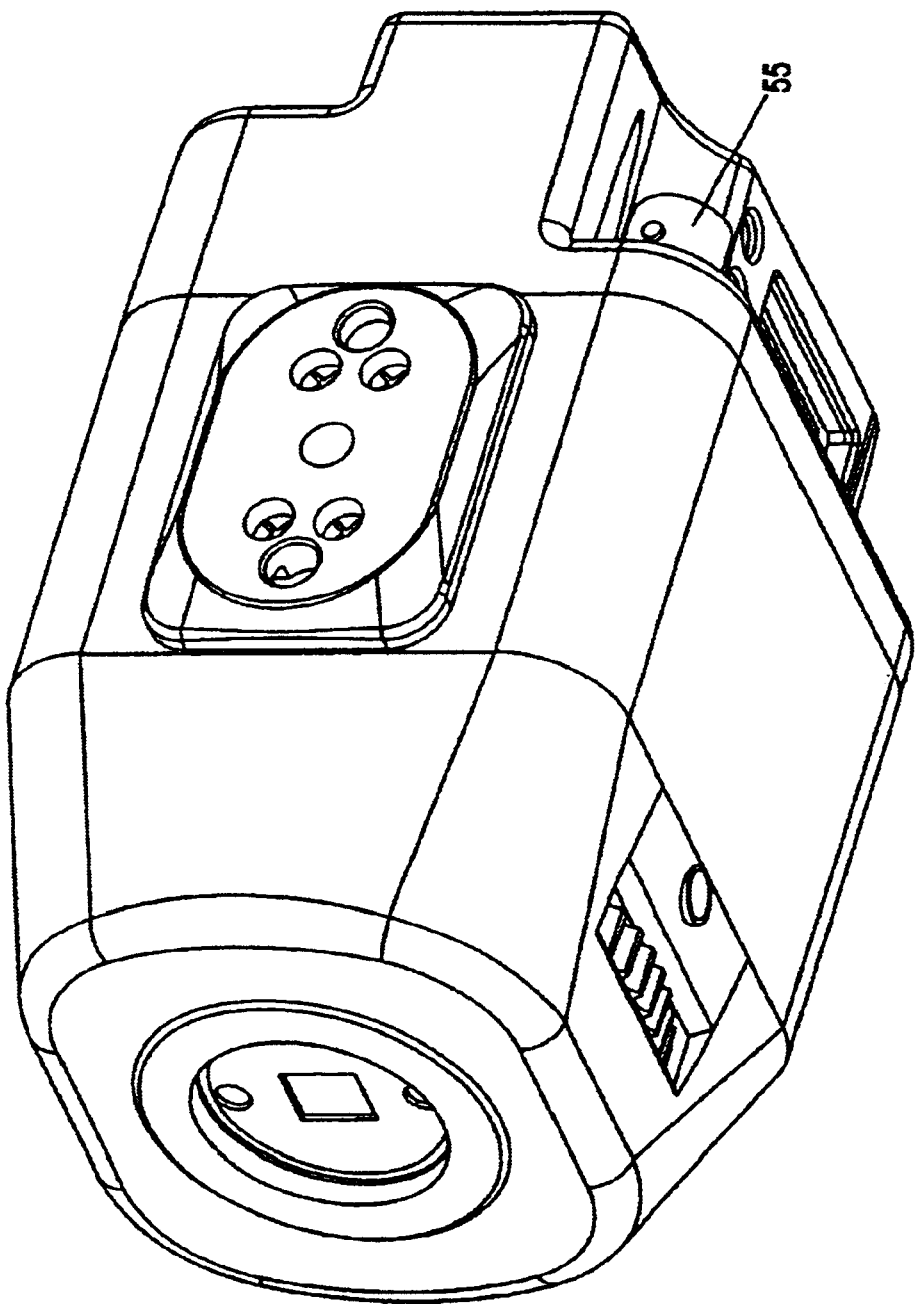
FIG. 7 is a front perspective view thereof.
Figure 8:
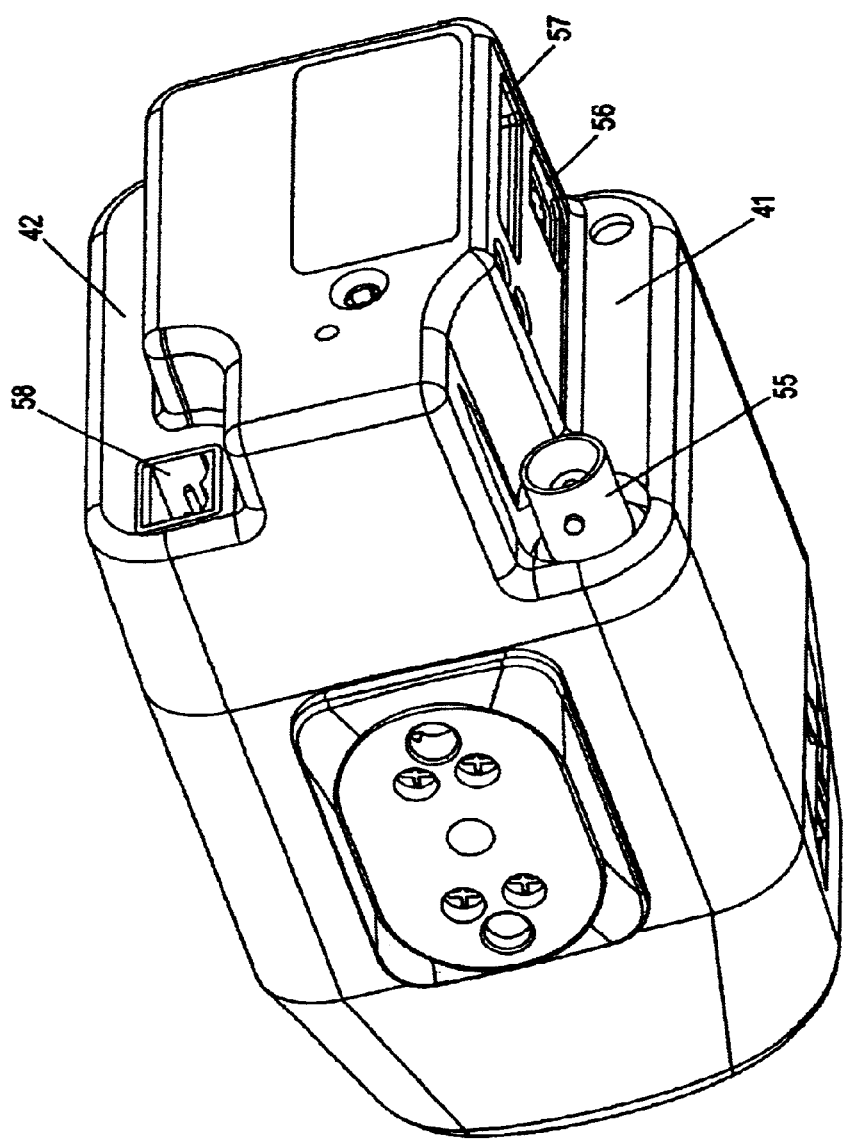
FIG. 8 is a rear perspective view thereof.

Referring to the drawings wherein like reference characters designate like or corresponding parts throughout the several views, and referring particularly to FIGS. 3 and 4, it is seen that the notched camera case of the present invention, generally 40, includes one or more cut out areas (recesses, notches) 41, 42 at the rear. The camera case profile without the notches is illustrated in phantom lines in FIGS. 3 and 4. In the embodiment depicted in the drawings, a first longitudinal notch 41 is provided at the left rear corner of case 40 extending from the top to the bottom. In the illustrations, a video jack 55 and lens control wire jack 56 are provided in this notch, together with a bank of resettable control switches 57. A second similar notch 42 is provided at the right rear corner of case 40, also extending from top to bottom. In the illustrations, the power supply jack 57 is provided in notch 42.

Figure 9:
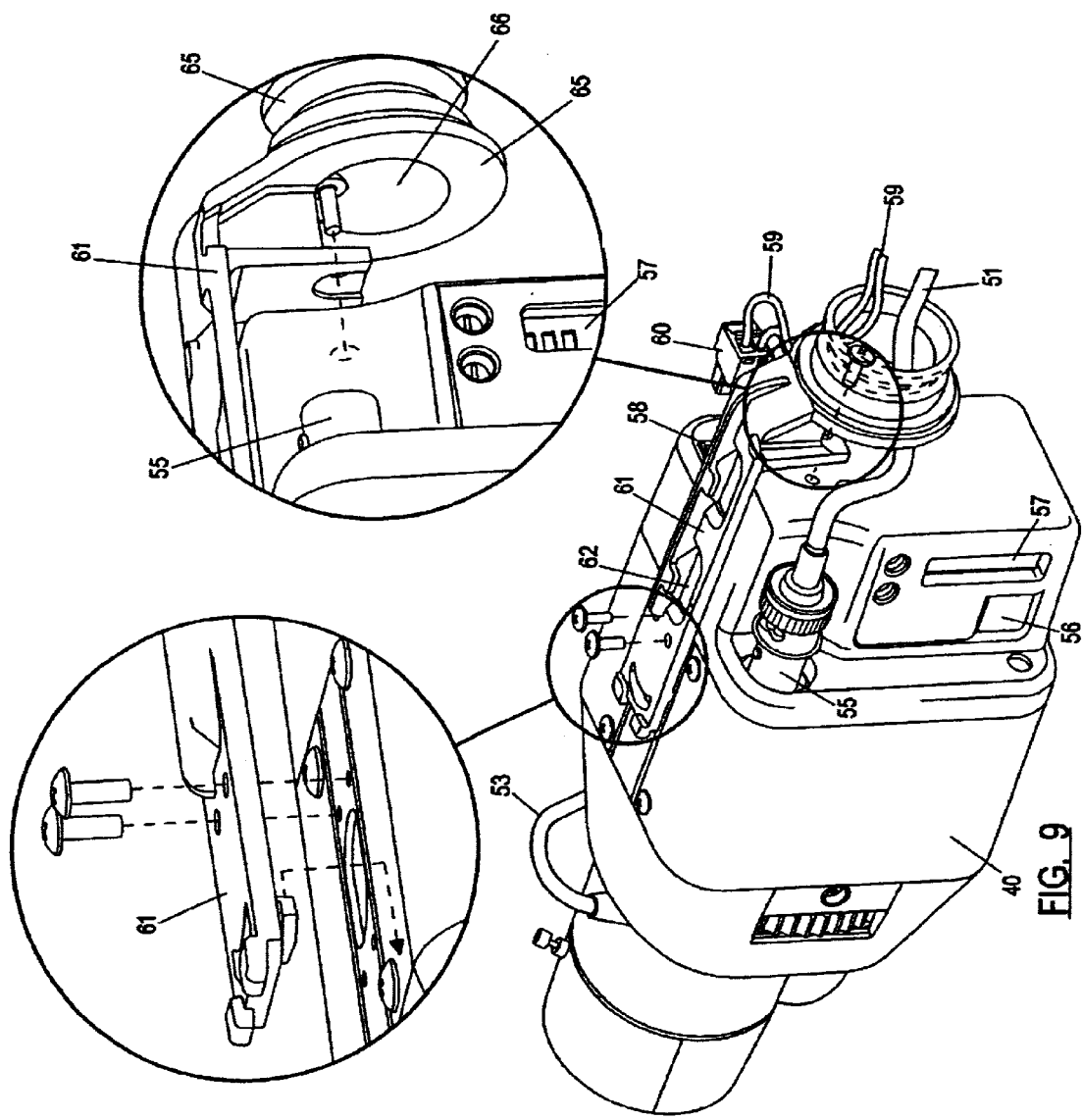
FIG. 9 is a rear perspective view showing detail of an embodiment including an attachment of an upper support bracket and wire guide on the case of the present invention together with associated detail of the video wire connection and routing.

A video cable 51 having connector 54 is installed by attaching connector 54 to video jack 55 and routing cable 51 through notch 41 to the back of the camera case 40 as shown in FIG. 9. Notch 41 is large enough to accommodate connector 54 and a portion of cable 51 that must extend straight out from connector 51 to avoid breakage. A control lens cable 53 with connector 52 is also installed in notch 41 by attaching connector 52 to jack 56 as shown in FIG. 9. Notch 41 is also large enough to accommodate connector 52 and a portion of cable 53 that must extend straight out from connector 52 to avoid breakage. Power supply wires 59 with connector 60 are installed in notch 42 by attaching connector 60 to jack 58 as shown in FIG. 9. Notch 42 is large enough to accommodate connector 60 and a portion of wires 59 that must extend straight out from connector 60 to avoid breakage.

It is to be appreciated that either of notches 41 or 42 may be eliminated, and/or additional notches may be provided such that the invention is not limited to the embodiment depicted in the illustrations. First notch 41 may be larger or smaller in size, and may be used to accommodate any of the following: video jack 55, lens control wire jack 56, control switches 57 and/or power supply jack 58 together with corresponding connectors wires and/or cables. Additional jacks and wires may also be provided in notch 41, depending upon the needs of the particular camera in use. Similarly, notch 42 may be larger or smaller in size, and may also be used to accommodate any of the following (depending upon whether a notch 41 is provided, and if so, which of these are already accommodated by notch 41): video jack 55, lens control wire jack 56, control switches 57 and/or power supply jack 58 together with corresponding connectors wires and/or cables. As with notch 41, additional jacks and wires may also be provided in notch 42, depending upon the needs of the particular camera in use.

It is also to be appreciated that grooves may be provided in the camera case leading from the notches to provide pathways for wires running to or from the connectors in the notches. Accordingly, a wide variety of different numbers, sizes, shapes and combinations of notches and grooves, as well as a wide variety of deployments of different jacks and wires in the different notches, are all contemplated by the present invention.

The notches in the camera case of the present invention accommodate the connectors, wires and cables of the camera thereby allowing the case to be deployed inside a camera enclosure having interior dimensions substantially the same as the exterior dimensions of the camera case without the notches. Such an enclosure may be very close to the same size as the camera case of the present invention, allowing it to be mounted in an area where space is at a premium. No extra space is required at the rear of the enclosure for the connectors, wires and cables as these are deployed in the notches of the camera. Thus, the notched camera case of the present invention may be efficiently deployed in a wide variety of camera enclosures that may or may not take advantage of the space saving feature of the notches.

Figure 10:
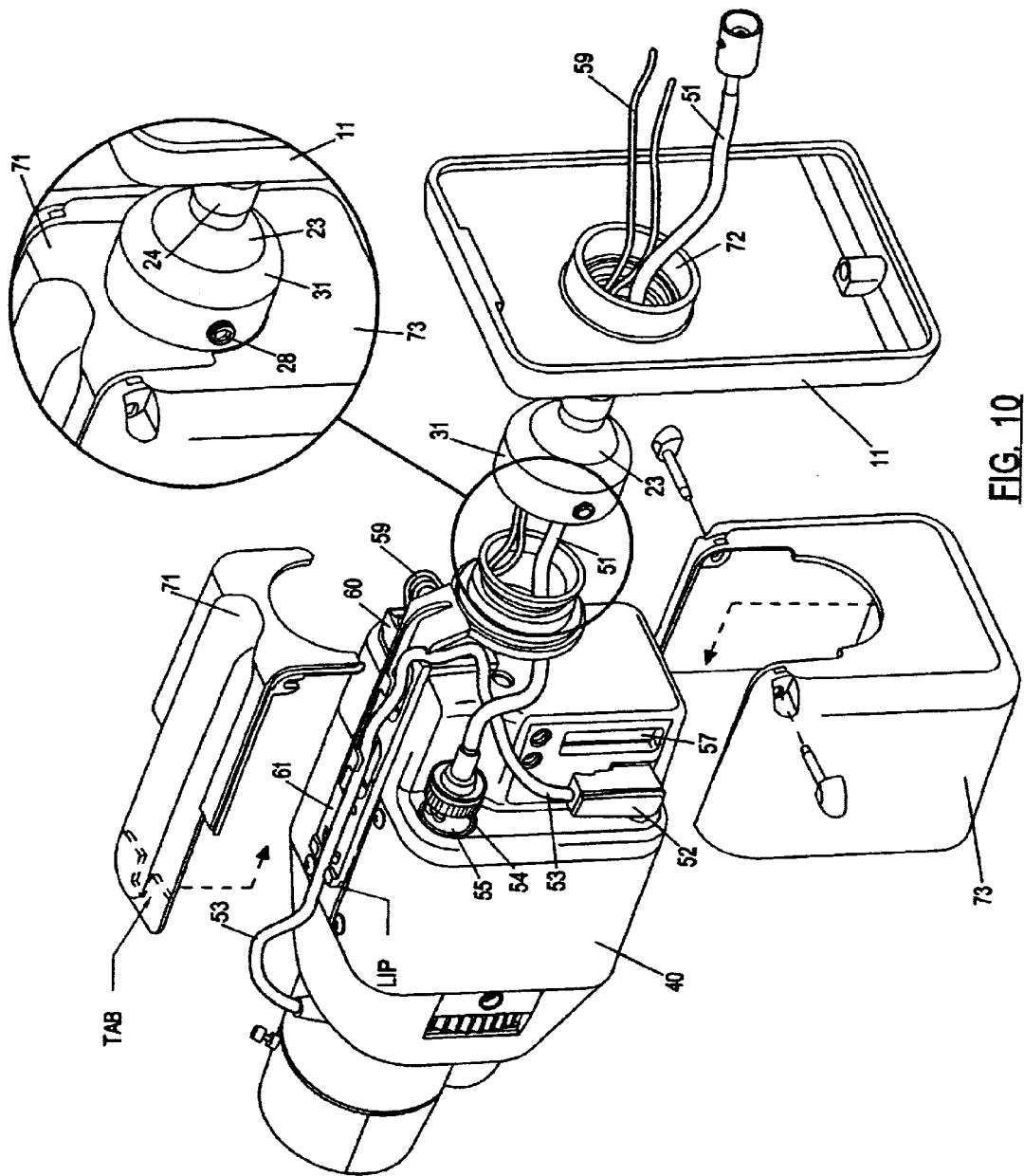
FIG. 10 is an exploded rear perspective view of the embodiment of FIG. 9 showing the attachment of electrical connectors, the routing of wires, and the attachment of an embodiment of a mount and cover plates to the camera case of the present invention.
Figure 11:
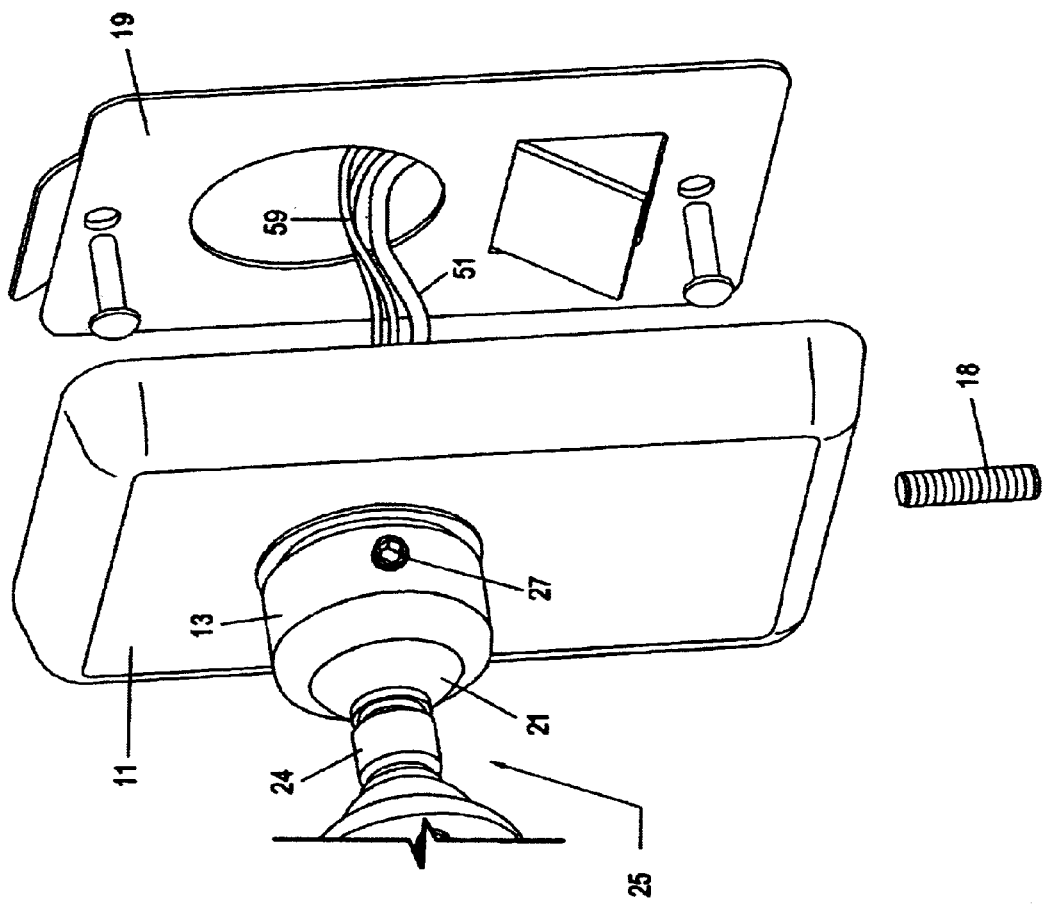
FIG. 11 is a partially exploded view of the surface mounting structure for the mount and camera case embodiment shown in FIG. 10.

FIGS. 9–11 illustrate a preferred mounting structure for a notched camera case of the type described above. A support bracket 61 is provided for attachment to the top of case 40 as shown in FIG. 9. Bracket 61 includes a guide 62 for the lens control cable 53, and an annular rear mount 65 for attachment to a support. An elongated top cover 71 is provided to cover bracket 61 (and cable 53 inside guide 62) protecting these elements from the outside. Cover 71 corresponds in size to bracket 61, and fits snugly against the top of case 40 and against rear mount 65. A back cover 73 is provided for attachment over the rear of notched camera case 40 as shown in FIG. 10 to protect rear notches 41 and 42 and the jacks, wires and connectors deployed therein. Cover 73 also fits snugly against case 40, rear mount 65 of bracket 61, and top cover 71. The attachment of bracket 61 and covers 71 and 73 to case 40 forms a complete camera enclosure having rear mount 65. This enclosure covers cable 53 and notches 41 and 42 together with the connectors, wires and cables deployed therein, leaving an annular opening 66 at the rear through which wires 59 and cable 51 are routed.

A support base is provided which includes a closed hollow conduit 25 that is attached at rear mount 65 for receiving wires 59 and cable 51 and channeling them to a surface mount. Conduit 25 also provides support for bracket 61 which, in turn, supports camera case 40 and covers 71 and 73. Conduit 25 may be provided in a rigid form such as a metal pipe, or it may be provided in a flexible form such as a sectional or spring-loaded tube.

In one embodiment, one end of conduit 25 may be provided with helical threads for engagement with corresponding threads provided on rear mount 65. Alternatively, the end of conduit 25 may be bolted or welded to rear mount 65. The opposite end of conduit 25 may likewise be threaded, bolted or welded to a surface mounted support structure.

A surface mounting plate 11 is provided to receive the opposite end of conduit 25. Plate 11 is provided with an annular opening and grommet 72 for receiving the wires and cables leading from conduit 25. As with the connection to the camera mount 65, the opposite end of conduit 25 may be provided with helical threads for engagement with corresponding threads provided on grommet 72. Alternatively, the opposite end of conduit 25 may be bolted or welded to grommet 72.

In the embodiment illustrated in the drawings, conduit 25 is in the form of a dual-ball coupler having an axial bore therethrough. Coupler 25 supports the camera enclosure and mount (including elements 40, 71, 73, 61 and 65) and receives the wires and cables leading therefrom. The dual-ball coupler 25 has a barbell shape and includes a pair of spherical structures or balls 21, 23 joined together by a central rod member 24. A bore 22 is provided through the center of the dual-ball coupler 25, passing through each of the balls 21,23 and the central rod 24. Wires and cables may be run from the camera enclosure to the base plate 11 through this bore.

Referring to FIG. 11, it is seen that the surface mount for this embodiment includes a cover plate 11 for attachment to a flat surface 12 (such as a wall or ceiling), and a ball socket joint 72 for receiving one end of a dual-ball coupler 25. Plate 11 may be attached to surface 12 using mounting screws, bolts or other suitable means that pass directly through plate 11 into the mounting surface 12. Alternatively, as shown in FIG. 11, a small support bracket 19 may be mounted to surface 12, and plate 11 fitted over bracket 19. Plate 11 may then be tightened against the bracket 19 using an Allen screw 18 or other similar device.

In this embodiment, the ball socket joint 72 on the mounting base 11 includes a rounded recessed area for receiving a ball 21 of the dual-ball coupler 25. An opening is provided in this recessed area to allow wires 59 and cable 51 to pass from the ball joint coupler 25 to and through base 11. Ball 21 of coupler 25 is placed in the recessed area, and cover 13 is fitted over ball 21 to hold it in place. Ball 21 may then be rotated 45° or more in any direction. Tightening set screw 27 fixes the location of the ball 21 and the angle of attachment to the base plate 11.

This embodiment also includes a second cover 31 provided at rear mount 65 of support bracket 61. Mount 65 includes a rounded recessed area for receiving ball 23 of the dual-ball coupler 25. An opening is provided in the recessed area, and a corresponding opening 66 is provided in bracket 61 to allow wires and cables to pass from the notches in camera case 40 to and through the ball joint coupler 25. Surrounding the recessed area is a cover 31. Ball 23 of the coupler 25 is placed in the recessed opening, and cover 31 is fitted over ball 23. Set screw 28 may then be tightened to hold ball 23 in place. Prior to tightening, ball 23 may be rotated 45° or more in any direction. Tightening screw 28 fixes the location of the ball 23 and the angle of attachment to bracket 61.

It is to be appreciated that the 45° range of rotation of ball 21 in cover 13 together with the additional 45° angle of rotation of ball 23 in cover 31 allows for a combined angle of rotation of 90° in any single direction. This allows for a combined potential rotation of a full 180° in both directions. It is also to be appreciated that the dual-ball coupler 25 allows the camera to be rotated a full 360° in the plane parallel to mounting surface 12 of bracket 19.

Changing of the position of the camera may be accomplished by loosening either or both of set screws 27 and 28, adjusting the camera to the desired position, and then re-tightening set screws 27 and 28.

It is to be understood that variations and modifications of the present invention may be made without departing from the scope thereof. It is also to be understood that the present invention is not to be limited by the specific embodiments or illustrations disclosed herein, but only in accordance with the appended claims when read in light of the foregoing specification.

What is claimed is:

1. A case for a surveillance camera comprising a housing mounted on a base, said housing having an exterior profile, an interior for holding the camera electronics in a minimal space, and at least one exterior recessed notch for accommodating at least one exterior receptor deployed in said at least one notch such that said at least one receptor does not extend beyond the exterior profile of said housing, said at least one receptor being in communication with the interior electronics.

2. The camera case of claim 1 wherein said at least one notch is sized to also accommodate a connector that corresponds with said at least one receptor without extending beyond the exterior profile of said case.

3. The camera case of claim 2 wherein said at least one notch is sized to also accommodate at least one wire attached to said connector without extending beyond the exterior profile of said case.

4. The camera case of claim 3 wherein at least one detachable cover is provided for engagement with said housing to cover said at least one notch and the at least one receptor, connector and wire deployed therein.

5. The camera case of claim 3 wherein an enclosure is provided for snugly surrounding said camera housing and the at least one notch therein, said enclosure having substantially the same overall dimensional profile as said camera housing.

6. The camera case of claim 3 wherein a support bracket is provided for detachable engagement with the top of said camera housing, said bracket including a recessed exterior groove for receiving at least one wire, said bracket also including a mounting support for attachment to a mounting base, said mounting support including a central opening for receiving said wires.

7. The camera case of claim 6 wherein at least one first detachable cover is provided for engagement with said housing to cover said at least one notch and the at least one receptor, connector and wire deployed therein; and at least one second detachable cover is provided for engagement with said case to cover said bracket and the at least one groove and the wire deployed therein.

8. The camera case of claim 7 wherein a dual ball coupler is provided for connecting said mounting support to a surface mountable base, said coupler having a hollow interior for receiving said wires.

9. The camera case of claim 6 wherein a dual ball coupler is provided for connecting said mounting support to a surface mountable base, said coupler having a hollow interior for receiving said wires.

10. The camera case of claim 2 wherein at least one exterior recessed groove having at least one guiding tab located thereon is provided in said housing to accommodate at least one wire attached to said connector, such that said at least one tab holds said at least one wire in said groove such that said at least one wire does not extend beyond the exterior profile of said case.

11. The camera case of claim 10 wherein the location of said at least one groove is selected from the group consisting of: at the back of said housing, on a side of said housing, on the top of said housing, on the bottom of said housing, and on a corner of said housing.

12. The camera case of claim 10 wherein at least one detachable cover is provided for engagement with said housing to cover said at least one groove and the wire deployed therein.

13. The camera case of claim 10 wherein at least one first detachable cover is provided for engagement with said housing to cover said at least one notch and the at least one receptor, connector and wire deployed therein; and at least one second detachable cover is provided for engagement with said case to cover said at least one groove and the wire deployed therein.

14. The camera case of claim 10 wherein an enclosure is provided for snugly surrounding said camera housing, the at least one notch therein and the at least one groove therein, said enclosure having substantially the same overall dimensional profile as said camera housing.

15. The camera case of claim 1 wherein a plurality of exterior recessed notches are provided in said housing for accommodating exterior receptors deployed in said notches such that said receptors do not extend beyond the exterior profile of said case, said receptors being in communication with the interior electronics.

16. The camera case of claim 1 wherein the location of said at least one notch is selected from the group consisting of: at the back of said housing, on a side of said housing, on the top of said housing, on the bottom of said housing, and on a corner of said housing.

17. The camera case of claim 1 wherein said housing has a front where camera optics are attached, a back where said at least one notch and receptor are located, a top, a bottom and sides, wherein a support bracket is attached to the top of said camera housing, said bracket having a recessed guide therein for receiving an optical control cable that extends from the front to the back of said camera housing.

* * * * *